US012425244B2

(12) United States Patent
Okazaki

(10) Patent No.: US 12,425,244 B2
(45) Date of Patent: Sep. 23, 2025

(54) DATA MANAGEMENT DEVICE AND DATA MANAGEMENT SYSTEM

(71) Applicant: TOYOTA JIDOSHA KABUSHIKI KAISHA, Aichi-ken (JP)

(72) Inventor: Takahisa Okazaki, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 244 days.

(21) Appl. No.: 18/314,822

(22) Filed: May 10, 2023

(65) Prior Publication Data

US 2024/0015036 A1    Jan. 11, 2024

(30) Foreign Application Priority Data

Jul. 7, 2022 (JP) .................................. 2022-109691

(51) Int. Cl.
| | |
|---|---|
| G06F 15/16 | (2006.01) |
| G06F 9/54 | (2006.01) |
| H04L 9/00 | (2022.01) |
| H04L 9/32 | (2006.01) |
| H04L 29/06 | (2006.01) |

(52) U.S. Cl.
CPC .............. *H04L 9/50* (2022.05); *H04L 9/3239* (2013.01)

(58) Field of Classification Search
CPC ..... H04L 9/50; H04L 9/3239; G06F 16/2255; G06F 21/64
USPC ........................................................ 713/168
See application file for complete search history.

(56) References Cited

U.S. PATENT DOCUMENTS

| | | | | |
|---|---|---|---|---|
| 8,656,166 | B2* | 2/2014 | Jacobs | G06Q 20/3829 713/168 |
| 2016/0065593 | A1* | 3/2016 | Bengochea | G06F 9/542 726/29 |
| 2017/0235970 | A1* | 8/2017 | Conner | G06F 21/44 707/690 |
| 2019/0163896 | A1* | 5/2019 | Balaraman | H04L 9/3226 |
| 2019/0295078 | A1* | 9/2019 | Bae | G06F 16/1824 |
| 2019/0295079 | A1* | 9/2019 | Bae | G06F 16/1824 |
| 2022/0058643 | A1* | 2/2022 | Nishida | G06F 21/64 |
| 2022/0321324 | A1* | 10/2022 | Scott | H04L 9/3218 |
| 2022/0376893 | A1* | 11/2022 | Fan | G06F 17/10 |
| 2023/0163970 | A1* | 5/2023 | Riggan | H04L 9/50 713/168 |
| 2023/0205849 | A1* | 6/2023 | Jackson | G06F 21/10 726/26 |

(Continued)

FOREIGN PATENT DOCUMENTS

| | | | | |
|---|---|---|---|---|
| JP | 2020119373 | A | 8/2020 | |
| KR | 20240157394 | A * | 11/2024 | ............... H04L 9/32 |

(Continued)

*Primary Examiner* — Hamza N Algibhah
(74) *Attorney, Agent, or Firm* — HAUPTMAN HAM, LLP

(57) ABSTRACT

The client device executes a simulation, and generates a data set including result data and metadata based on the execution result. The client device generates a first hash value of the data set and transmits the data set and the first hash value to the data management device. When the data set and the first hash value are received from the client device, the data management device generates a second hash value of the data set from the data set. The data management device decides to register the data set in the distributed ledger when the first hash value and the second hash value match each other.

4 Claims, 3 Drawing Sheets

(56) References Cited

U.S. PATENT DOCUMENTS

| | | | | |
|---|---|---|---|---|
| 2023/0315424 A1* | 10/2023 | Shen | .......................... | H04L 9/50 |
| 2023/0360779 A1* | 11/2023 | Gnanasambandam | ....................... G06Q 20/3678 | |
| 2024/0031373 A1* | 1/2024 | Gupta | ................... | H04L 63/102 |
| 2024/0171379 A1* | 5/2024 | Mano | ................... | H04L 63/0435 |
| 2024/0235845 A1* | 7/2024 | Zhao | ..................... | H04L 9/3242 |
| 2024/0291664 A1* | 8/2024 | Meirosu | .................... | H04L 9/50 |

FOREIGN PATENT DOCUMENTS

| | | | | |
|---|---|---|---|---|
| WO | WO-2019161453 A1 * | 8/2019 | ........... | G06F 21/602 |
| WO | WO-2020213226 A1 * | 10/2020 | ............... | H04L 9/50 |
| WO | WO-2023188039 A1 * | 10/2023 | ......... | G06F 16/2379 |

\* cited by examiner

DATA MANAGEMENT DEVICE AND DATA MANAGEMENT SYSTEM

CROSS-REFERENCE TO RELATED APPLICATION

This application claims priority to Japanese Patent Application No. 2022-109691 filed on Jul. 7, 2022, incorporated herein by reference in its entirety.

BACKGROUND

1. Technical Field

The present disclosure relates to a data management device and a data management system that manage data using distributed ledger technology.

2. Description of Related Art

Japanese Unexamined Patent Application Publication No. 2020-119373 (JP 2020-119373 A) discloses a vehicle information management system that uses blockchain technology to store vehicle information indicating data relating to the manufacture, sale, and operation of vehicles. The vehicle information management system uses blockchain technology to increase the reliability of vehicle traceability regarding the manufacture, sale, and operation of the vehicles.

SUMMARY

By using distributed ledger technology such as blockchain technology, the falsification resistance of data recorded in the distributed ledger can be improved. However, the technology disclosed in JP 2020-119373 A cannot prevent falsification of data at the time of registration of the data in the distributed ledger, registration of erroneous data in the distributed ledger, and the like.

The present disclosure has been made to solve the above issue, and an object of the present disclosure is to suppress falsification of data at the time of registration of the data in the distributed ledger and registration of erroneous data in the distributed ledger.

(1) A data management device according to an aspect of the present disclosure manages data received from an external device using distributed ledger technology. The data management device includes a storage device that stores a distributed ledger, a communication device configured to be able to communicate with the external device, and a control device that registers transaction data in the distributed ledger. The external device is configured to execute generation of the data and generation of a first hash value that is a hash value of the data, as a series of processes. The control device receives the data and the first hash value from the external device via the communication device, generates a second hash value by hashing the received data based on the same hash algorithm as a hash algorithm used to generate the first hash value, and registers the transaction data including the data in the distributed ledger when the first hash value and the second hash value match each other.

According to the above configuration, when the first hash value received form the external device and the second hash value generated by hashing the data received from the external device based on the same hash algorithm as the hash algorithm used to generate the first hash value match each other, the data management device registers transaction data including the data in the distributed ledger. Since the external device is configured to execute the generation of the data and the generation of the first hash value as a series of processes, for example, when a malicious person falsifies the data, the falsified data cannot be hashed based on the same hash algorithm as the algorithm used to generate the first hash value. Therefore, the first hash value that is the hash value of the genuine data, does not match the second hash value that is the hash value of the falsified data. For example, when erroneous data is transmitted to the data management device, the first hash value that is the hash value of the genuine data and the second hash value that is the hash value of erroneously transmitted data (erroneous data) do not match each other. Therefore, by registering the transaction data including the data in the distributed ledger when the first hash value and the second hash value match each other, falsification of the data at the time of registration of the data in the distributed ledger and registration of erroneous data in the distributed ledger can be suppressed.

(2) In an embodiment, the control device does not register the transaction data including the data in the distributed ledger when the first hash value and the second hash value do not match each other.

According to the above configuration, when the first hash value and the second hash value does not match each other, the transaction data including the data is not registered in the distributed ledger, and thus falsification of the data at the time of registration of the data in the distributed ledger and registration of erroneous data in the distributed ledger can be suppressed.

(3) In an embodiment, the data includes a data body and metadata of the data body, and the metadata includes information used to generate the data body.

According to the above configuration, the metadata includes the information used to generate the data body, so when a sharer of the distributed ledger refers to the data, the conditions in which the data body has been generated can be recognized by referring to the metadata. Therefore, a third party (sharer) can determine whether the data body is appropriate.

(4) A data management system according to another aspect of the present disclosure includes a first device that executes generation of data and generation of a first hash value that is a hash value of the data, as a series of processes, and a second device that manages the data using distributed ledger technology. The first device and the second device include the same hash algorithm. The first device transmits the data and the first hash value to the second device. The second device generates a second hash value by hashing the data that is received, and registers transaction data including the data in a distributed ledger when the first hash value and the second hash value match each other.

According to the present disclosure, falsification of data at the time of registration of the data in the distributed ledger and registration of erroneous data in the distributed ledger can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
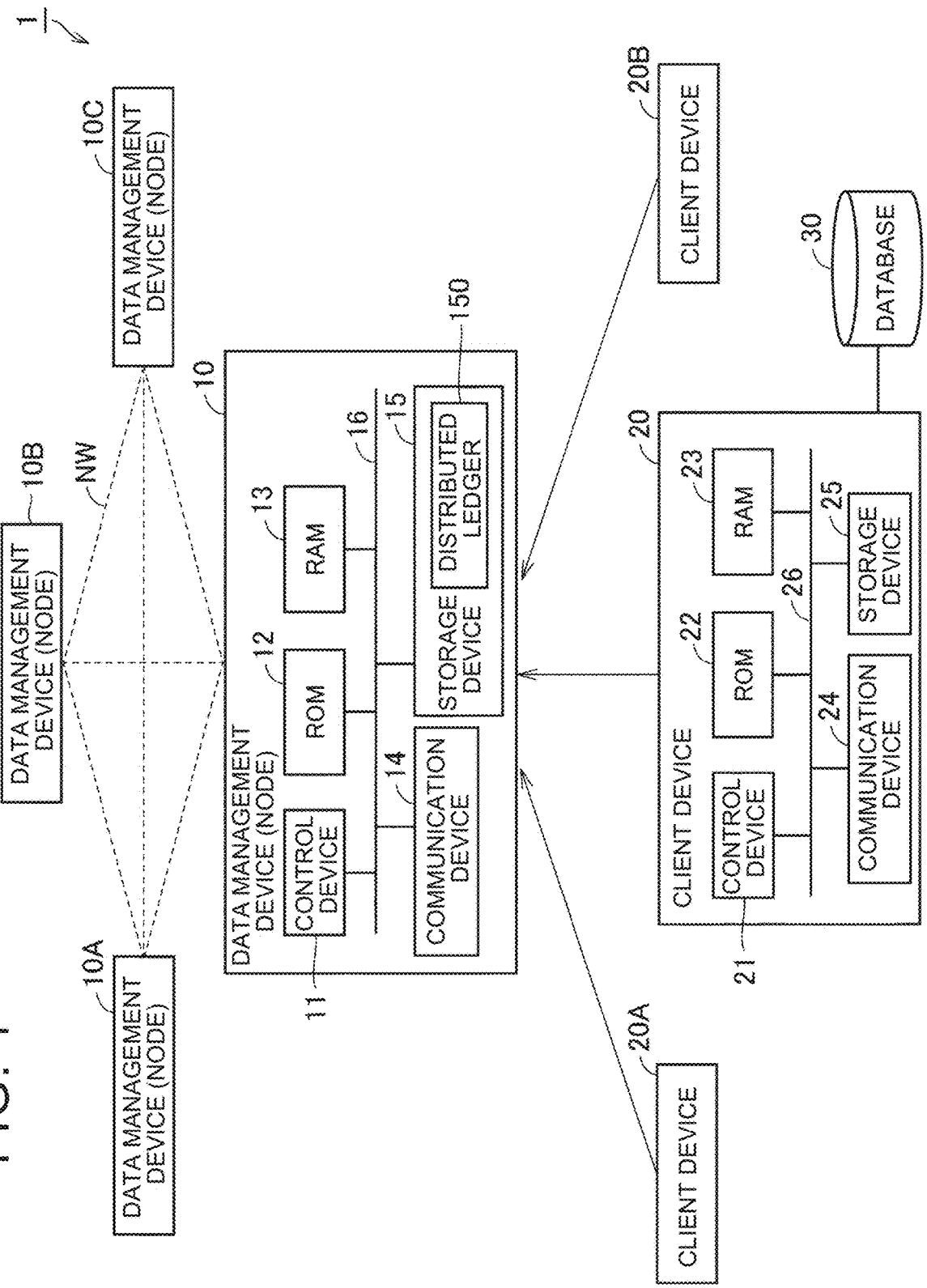
FIG. 1 is a diagram showing a schematic configuration of a data management system according to an embodiment.

Hereinafter, embodiments of the present disclosure will be described in detail with reference to the drawings. In the drawings, the same or corresponding portions are denoted by the same reference signs and the description thereof will not be repeated.

Overall Configuration

FIG. 1 is a diagram showing a schematic configuration of a data management system 1 according to the present embodiment. The data management system 1 is a system for forming a network among a plurality of companies and/or a plurality of departments to manage various types of data.

The data management system 1 includes a plurality of data management devices 10, 10A, 10B, 10C and a plurality of client devices 20, 20A, 20B. In the embodiment, each of the four data management devices 10, 10A, 10B, 10C is a data management device that belongs to a different company (for example, a company A, a company B, a company C, and a company D). In one example, the data management device 10 belongs to the company A, the data management device 10A belongs to the company B, the data management device 10B belongs to the company C, and the data management device 10C belongs to the company D. The companies A to D form, for example, a consortium for vehicle development. Although the data management device 10 will be described below as a representative example, the data management devices 10A to 10C also have the same function as the data management device 10.

The four data management devices 10, 10A to 10C form a network NW. The distributed ledger technology using blockchain is applied to the data management system 1 according to the present embodiment. Various types of data received by each of the data management devices 10, 10A to 10C from the client devices are recorded in the distributed ledger owned by each of the data management devices 10, 10A to 10C. In the data management system 1 according to the present embodiment, an example in which the four data management devices 10, 10A to 10C form the network NW will be described, but the number of data management devices forming the network NW is as desired, and may be, for example, less than four, or may be five or more.

Each of the client devices 20, 20A, 20B is a terminal device belonging to a different department of the company A. Each of the client devices 20, 20A, 20B may be, for example, a desktop personal computer (PC), a laptop PC, a tablet terminal, a smartphone, or other information processing terminals having a communication function. Each of the client devices 20, 20A, 20B is configured to be able to communicate with the data management device 10. Note that the number of client devices configured to be able to communicate with the data management device 10 is as desired, and may be, for example, less than three, or may be four or more. Although not shown, the data management system 1 includes at least one client device that is configured to be able to communicate with the data management device 10A and that belongs to the company B, at least one client device that is configured to be able to communicate with the data management device 10B and that belongs to the company C, and at least one client device that is configured to be able to communicate with the data management device 10C and that belongs to the company D. Although the client device 20 will be described below as a representative, other client devices also have the same function as the client device 20.

Configuration of Data Management Device

The data management device 10 includes a control device 11, a read-only memory (ROM) 12, a random access memory (RAM) 13, a communication device 14, and a storage device 15. The control device 11, the ROM 12, the RAM 13, the communication device 14, and the storage device 15 are connected to a bus 16. Blockchain-based software is installed in the data management device 10, and the installed blockchain-based software functions so that the data management device 10 functions as a node in the network NW. Note that the data management device 10 corresponds to an example of the "second device" according to the present disclosure.

The control device 11 is constituted by, for example, an integrated circuit including a central processing unit (CPU). The control device 11 expands various programs stored in the ROM 12 into the RAM 13 and executes the programs. Various programs include an operating system and the like. The RAM 13 functions as a working memory and temporarily stores various types of data needed to execute various programs. The control device 11 has a function of generating transaction data.

The communication device 14 is configured to be able to communicate with other nodes (data management devices 10A to 10C) forming the network NW. Also, the communication device 14 is configured to be able to communicate with the client devices 20, 20A, 20B. Communication between the communication device 14 and other nodes or the client devices 20, 20A, 20B may be performed via the Internet, a wide area network (WAN), a local area network (LAN), an Ethernet (registered trademark) network, a public network, a private network, a wired network, a wireless network, etc., or a combination thereof.

The storage device 15 includes, for example, a storage medium such as a hard disk or flash memory. The storage device 15 stores a distributed ledger 150. The distributed ledger 150 stores transaction data approved by the nodes (data management devices 10, 10A to 10C) from the start of operation of the data management system 1 to the present. The distributed ledger 150 consists of a series of blocks. An appropriate consensus algorithm in the network NW can be appropriately adopted according to the specification of the data management system 1 and the like. The distributed ledger 150 is held by all the data management devices 10, 10A to 10C forming the network NW. As a result, even when the distributed ledger 150 of the data management device 10 is falsified, making falsification is suppressed based on the distributed ledgers (not shown) of the other data management devices 10A to 10C.

When data is received from, for example, the client device 20 via the communication device 14, the control device 11 generates transaction data for storing the data in the distributed ledger 150. The control device 11 then transmits the generated transaction data to the network NW via the communication device 14. The transaction data includes, for example, a transaction identifier (ID) for identifying the transaction data, result data and metadata which will be described later, time information for broadcasting the transaction data to the network NW (transmitting to the network NW), sender information of the transaction data, electronic signature, and the like.

Configuration of Client Device

The client device 20 includes a control device 21, a ROM 22, a RAM 23, a communication device 24, and a storage device 25. The control device 21, the ROM 22, the RAM 23, the communication device 24, and the storage device 25 are connected to a bus 26. A database 30 is connected to the client device 20 so as to be able to communicate with the client device 20. Note that the client device 20 corresponds to an example of an "external device" and a "first device" according to the present disclosure.

The control device 21 is constituted by, for example, an integrated circuit including a CPU. The control device 21 expands various programs stored in the ROM 22 into the RAM 23 and executes the programs. Various programs include an operating system and the like. A hash function based on a predetermined hash algorithm is stored in the ROM 22. The RAM 23 functions as a working memory and temporarily stores various types of data needed to execute various programs.

The database 30 stores, for example, various simulation models. Various simulation models may include, for example, a simulation model regarding fuel consumption of a vehicle, a simulation model regarding power transmission in charging an in-vehicle battery, a simulation model regarding engine output, and the like. Identification information (hereinafter also referred to as "model ID") for identifying the model is assigned to each of the simulation models.

The control device 21 reads a desired simulation model from the database 30 and executes a simulation using the simulation model and setting information. The setting information is set, for example, by a user of the client device 20, as environment information for executing the simulation. The control device 21 generates data (hereinafter also referred to as "result data") indicating the result of executing the simulation and metadata based on the execution result of the simulation. The metadata includes, for example, the model ID of the executed simulation model, a parameter in the model, setting information (environment information), and the like. The control device 21 causes the storage device 25 to store the result data and the metadata. The result data and the metadata constitute a "data set" described below. The result data corresponds to an example of the "data body" according to the present disclosure.

The communication device 24 is configured to be able to communicate with the data management device 10. Communication between the communication device 24 and the data management device 10 (communication device 14) may be performed via the Internet, a wide area network (WAN), a local area network (LAN), an Ethernet (registered trademark) network, a public network, a private network, a wired network, a wireless network, etc., or a combination thereof.

The storage device 25 includes, for example, a storage medium such as a hard disk or flash memory. The storage device 25 stores the result data and the metadata.

In the data management system 1 having the configuration described above, it is conceivable that the companies or the departments mutually refer to the data (for example, simulation models and result data, etc.) registered in the distributed ledger in order to reduce the lead-time for vehicle development and the cost. The data registered in the distributed ledger is enhanced in falsification resistance by distributed ledger technology (blockchain technology in the embodiment). Using the distributed ledger technology, it is possible to suppress falsification of data after the data is registered in the distributed ledger. However, falsification of data at the time of registration of the data in the distributed ledger, registration of erroneous data in the distributed ledger, and the like cannot be prevented. Since the data registered in the distributed ledger is also expected to be used as evidence in development and authentication, falsification of data at the time of registration of the data in the distributed ledger and registration of erroneous data in the distributed ledger are desired to be suppressed.

Therefore, the control device 21 of the client device 20 executes a simulation and generates a "data set" of result data and metadata, and the data set is input to a hash function to generate a hash value H1 of the data set. The program is created so that the processes from the execution of the simulation to the generation of the hash value of the data set are executed as a series of processes. That is, when the simulation is executed, the data set and the hash value H1 are generated. For example, it is not possible to execute the simulation only to generate the data set (not generate the hash value H1), or to execute only the process of generating a hash value alone. After executing the simulation and generating the data set and the hash value H1, the control device 21 transmits the data set and the hash value H1 to the data management device 10 via the communication device 24.

When the data set and the hash value H1 are received from the client device 20 via the communication device 14, the control device 11 of the data management device 10 inputs the received data set to a hash function to generate a hash value H2 of the data set. The ROM 12 of the data management device 10 stores a hash function having the same hash algorithm as the hash function implemented in the client device 20 (stored in the ROM 22). The control device 11 compares the received hash value H1 with the generated hash value H2, and when the two values match each other, it is confirmed that the data set is not falsified and that an erroneous data set is not transmitted. Then transaction data including the data set is generated and transmitted to the network NW. When the hash value H1 and the hash value H2 do not match each other, the control device 11 determines that there is a possibility that the data set is falsified, or that an erroneous data set is transmitted from the client device 20, and do not generate transaction data.

In this way, in the client device 20, the processes from execution of the simulation to the generation of the data set and the hash value H1 are executed as a series of processes. Then, the data management device 10 compares the hash value H1 of the data set received from the client device 20 with the hash value H2 generated from the data set. (1) For example, when the result data has been falsified before the data set and the hash value H1 are transmitted from the client device 20 to the data management device 10, the falsified result data (hereinafter also referred to as "falsified data") and the hash value H1 are transmitted to the data management device 10 from the client device 20. At this time, since the processes from the execution of the simulation to the generation of the data set and the hash value H1 are configured as a series of processes, the hash value H1 transmitted from the client device 20 to the data management device 10 is a hashed data set of result data and metadata that are not falsified. On the other hand, the data management device 10 hashes the data set of the falsified data and the metadata to generate a hash value H2. Therefore, the hash value H1 and the hash value H2 do not match each other, and an abnormality can be detected in the data management device 10. (2) For example, when an erroneous data set is transmitted from the client device 20 to the data management device 10, the data management device 10 acquires the erroneous data set and the hash value H1. The hash value H1 is a hash value H1 generated by inputting a correct data set to be originally transmitted, to a hash function. The data management device 10 hashes the erroneous data set to generate a hash value H2. Therefore, the hash value H1 and the hash value H2 do not match each other, and an abnormality can be detected in the data management device 10. As in the examples (1) and (2) above, because an abnormality is not detected, the data management device 10 can confirm that the data to be registered in the distributed ledger 150 is not falsified and that erroneous data is not transmitted from the client device 20. Therefore, falsification of data at the time of registration of the data in the distributed ledger 150 and registration of erroneous data in the distributed ledger 150 can be suppressed.

Functional Block

Figure 2:
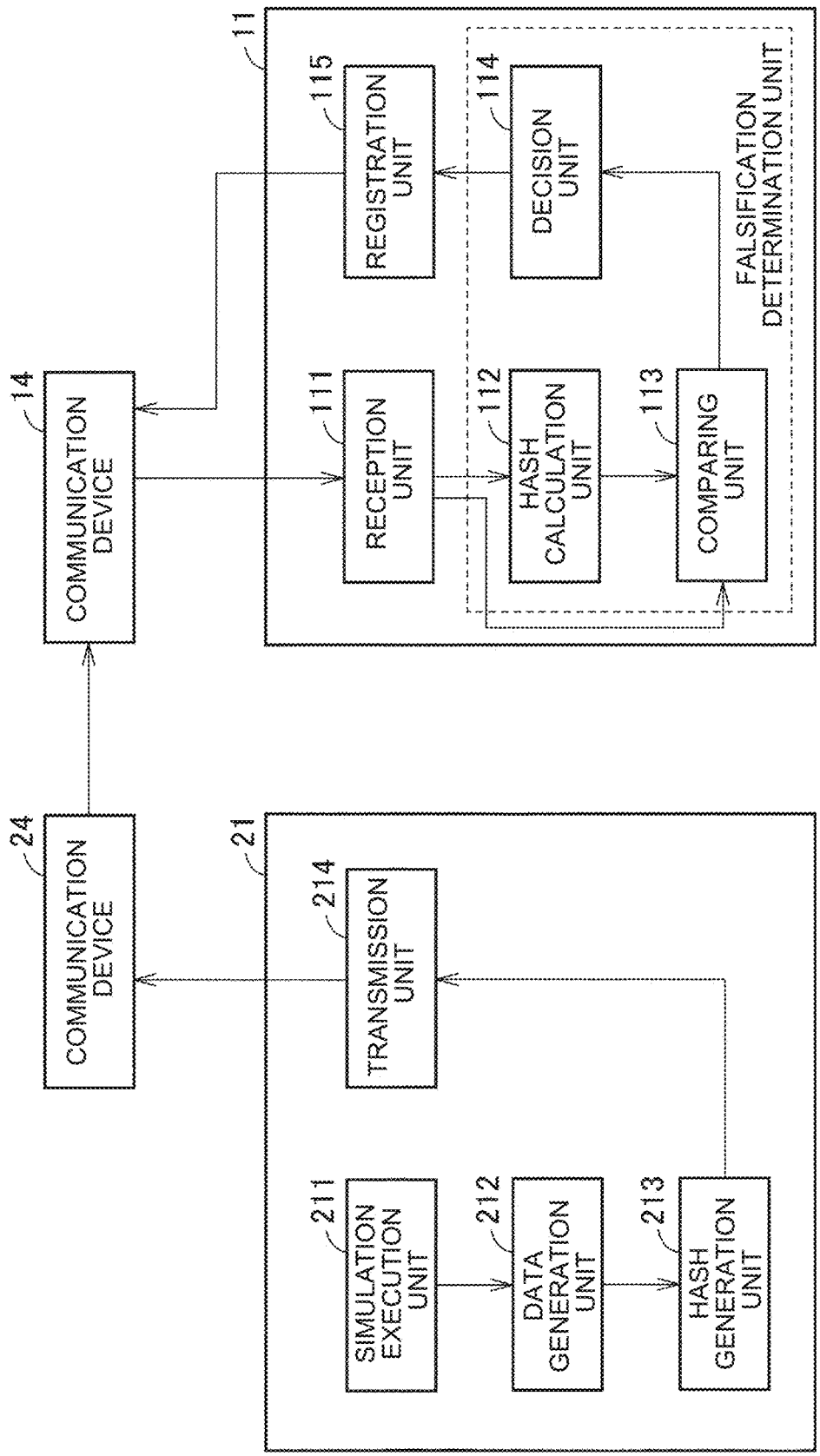
FIG. 2 is a functional block diagram relating to data registration in a distributed ledger of a control device of a data management device and a control device of a client device.

FIG. 2 is a functional block diagram relating to data registration in the distributed ledger of the control device 11 of the data management device 10 and the control device 21 of the client device 20. Referring to FIG. 2, the control device 21 of the client device 20 includes a simulation execution unit 211, a data generation unit 212, a hash generation unit 213, and a transmission unit 214. The control device 21 functions as the simulation execution unit 211, the data generation unit 212, the hash generation unit 213, and the transmission unit 214 by executing a program stored in the ROM 22, for example. Note that the simulation execution unit 211, the data generation unit 212, the hash generation unit 213, and the transmission unit 214 may be realized by dedicated hardware (electronic circuit), for example.

The simulation execution unit 211 reads a desired simulation model from the database 30 and executes a simulation using the simulation model and setting information.

The data generation unit 212 generates the result data and the metadata based on the execution result of the simulation by the simulation execution unit 211. The data generation unit 212 outputs the data set of the result data and the metadata to the hash generation unit 213.

The hash generation unit 213 inputs the data set to the hash function to generate the hash value H1 of the data set. The hash generation unit 213 outputs the data set and the hash value H1 to the transmission unit 214.

The transmission unit 214 outputs to the communication device 24 a control signal for transmitting the data set and the hash value H1 to the data management device 10. As a result, the data set and the hash value H1 are transmitted to the data management device 10 via the communication device 24.

The control device 11 of the data management device 10 includes a reception unit 111, a hash calculation unit 112, a comparing unit 113, a decision unit 114, and a registration unit 115. The control device 11 functions as the reception unit 111, the hash calculation unit 112, the comparing unit 113, the decision unit 114, and the registration unit 115 by executing a program stored in the ROM 12, for example. Note that the reception unit 111, the hash calculation unit 112, the comparing unit 113, the decision unit 114, and the registration unit 115 may be realized by dedicated hardware (electronic circuit), for example.

The reception unit 111 receives the data set and the hash value H1 from the client device 20 via the communication device 14. The reception unit 111 outputs the received data set to the hash calculation unit 112. The reception unit 111 outputs the received data set and the hash value H1 to the comparing unit 113.

The hash calculation unit 112, the comparing unit 113, and the decision unit 114 function as a falsification determination unit that determines that the received data set is not falsified and that an erroneous data set is not transmitted.

The hash calculation unit 112 inputs the data set received from the reception unit 111 to the hash function to generate the hash value H2 of the data set. The hash calculation unit 112 outputs the hash value H2 to the comparing unit 113.

The comparing unit 113 compares the hash value H1 with the hash value H2. When the two values match each other, the comparing unit 113 outputs information indicating that the two values have matched each other and the data set to the decision unit 114. When the two values do not match each other, the comparing unit 113 outputs information indicating that the two values have not matched each other to the decision unit 114.

The decision unit 114 decides whether to register the data set in the distributed ledger 150. When the decision unit 114 receives the information indicating that the two values have matched each other from the comparing unit 113, the decision unit 114 determines that the data set received from the client device 20 has no falsification or error, and decides to register the data set in the distributed ledger 150. When the decision unit 114 receives the information indicating that the two values have not matched each other from the comparing unit 113, the decision unit 114 determines that the data set received from the client device 20 has falsification or error, and decides not to register the data set in the distributed ledger 150. The decision unit 114 outputs the decision result to the registration unit 115. Note that, when the decision unit 114 decides to register the data set in the distributed ledger 150, the decision unit 114 outputs the data set to the registration unit 115 together with the decision result.

When the decision unit 114 decides to register the data set in the distributed ledger 150, the registration unit 115 generates the transaction data including the data set. The registration unit 115 outputs to the communication device 14 a control signal for transmitting the transaction data to the network NW. Thereby, the transaction data is transmitted to the network NW via the communication device 14. As a result, the data set (that is, the result data and the metadata) is registered in the distributed ledger 150. When the decision unit 114 decides not to register the data set in the distributed ledger 150, the registration unit 115 does not generate the transaction data.

Flowchart

Figure 3:
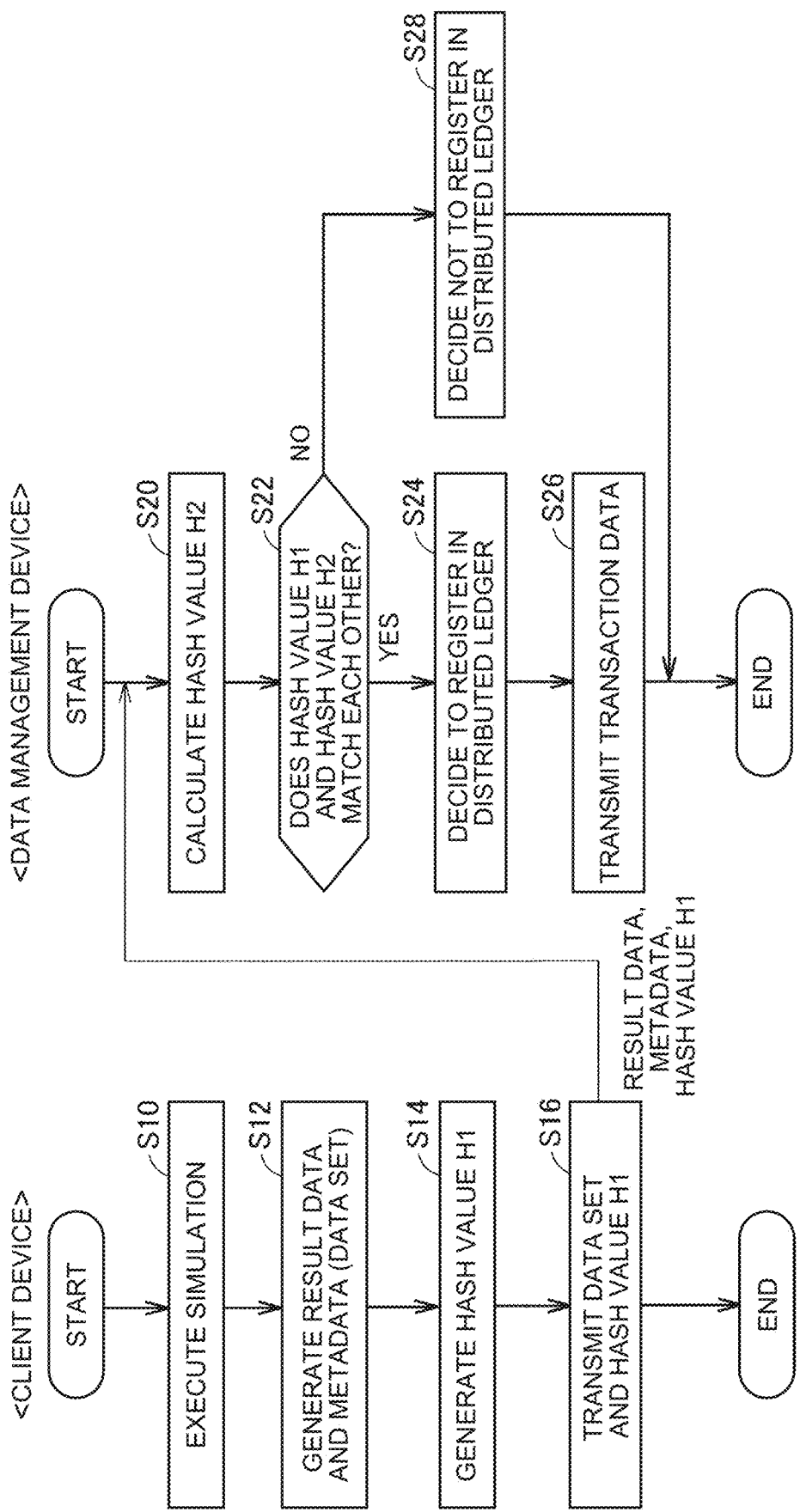
FIG. 3 is a flowchart showing a procedure of a process executed by the data management device and the client device.

FIG. 3 is a flowchart showing a procedure of a process executed by the data management device 10 and the client device 20. The process of the flowchart shown in FIG. 3 is started when the client device 20 receives an instruction instructing to execute a simulation. The instruction instructing the execution of the simulation is generated, for example, by the user's operation on the client device 20. Described is a case in which each step (hereinafter step is abbreviated as "S") of the flowchart shown in FIG. 3 is realized by a software process by the control device 11 of the data management device 10 and the control device 21 of the client device 20. However, a part or all of the steps may be realized by hardware (electronic circuit) made in the control device 11 and the control device 21.

In S10, the client device 20 reads a simulation model in accordance with an input from the database 30 and executes a simulation using the simulation model and setting information (environment information) set by the user of the client device 20.

In S12, the client device 20 generates a data set including result data and metadata based on the execution result of the simulation in S10.

In S14, the client device 20 inputs the data set to a hash function to generate a hash value H1 of the data set. Note that the processes from S10 to S14 are executed as a series of processes.

In S16, the client device 20 outputs to the communication device 24 a control signal for transmitting the data set and the hash value H1 to the data management device 10. As a result, the data set and the hash value H1 are transmitted from the client device 20 to the data management device 10.

In S20, when the data set and the hash value H1 are received from the client device 20, the data management device 10 inputs the received data set to a hash function to generate a hash value H2 of the data set.

In S22, the data management device 10 compares the hash value H1 with the hash value H2 and determines whether the two values match each other. When the hash value H1 and the hash value H2 match each other (YES in S22), the data management device 10 causes the process to proceed to S24. When the hash value H1 and the hash value H2 do not match each other (NO in S22), the data management device 10 causes the process to proceed to S28.

In S24, the data management device 10 decides to register the data set (the result data and the metadata) in the distributed ledger 150.

In S26, the data management device 10 generates transaction data including the data set. The data management device 10 outputs to the communication device 14 a control signal for transmitting the transaction data to the network NW. As a result, the transaction data including the data set is transmitted to the network NW and the data set (the result data and the metadata) is registered in the distributed ledger 150.

In S28, the data management device 10 decides not to register the data set (the result data and the metadata) in the distributed ledger 150. In this case, the data management device 10 terminates the process without generating the transaction data.

As described above, the client device 20 in the data management system 1 according to the present embodiment executes the simulation to generate the data set of the result data and the metadata, inputs the data set to the hash function, and generates the hash value H1 of the data set. The data management device 10 compares the hash value H1 generated by the client device 20 with the self-generated hash value H2, and when the two values match each other, it is determined that the data set has no falsification or error. Then transaction data including the data set is generated and transmitted to the network NW. On the other hand, when the two values do not match each other, the data management device 10 determines that the data set may be falsified, and does not generate transaction data. The data management device 10 and the client device 20 implement a hash function based on the same hash algorithm. The client device 20 executes the processes from execution of the simulation to the generation of the data set and the hash value H1 as a series of processes. Therefore, for example, when a malicious person falsifies the result data, the hash value H1 obtained by hashing the data set including the genuine result data before falsification and the hash value H2 obtained by hashing the data set including the falsified result data (falsified data) do not match each other. Thus, the data management device 10 can detect an abnormality. When an erroneous data set is transmitted from the client device 20 to the data management device 10, the hash value H1 obtained by hashing the genuine data set and the hash value H2 obtained by hashing the erroneously transmitted data set do not match each other. Therefore, the data management device 10 can detect an abnormality. As a result, the data management device 10 can confirm that the data to be registered in the distributed ledger 150 is not falsified and that erroneous data is not transmitted from the client device 20. Therefore, falsification of data at the time of registration of the data in the distributed ledger 150 and registration of erroneous data in the distributed ledger 150 can be suppressed.

Further, in the data management system 1 according to the embodiment, result data and metadata are registered in the distributed ledger 150. The metadata includes, for example, the model ID of the executed simulation model, a parameter in the model, calculation (environment) information, and the like. As a result, when a company (or department) other than the company (or department) that registered the result data and the metadata in the distributed ledger 150 refers to the result data, the conditions (parameters, calculation information, etc.) in which the simulation has been executed can be recognized, by referring to the metadata. Therefore, since it is possible to determine whether the simulation has been appropriately executed, it is possible to determine whether the result data is appropriate.

The embodiment disclosed herein should be considered to be exemplary and not restrictive in all respects. The scope of the present disclosure is shown by the scope of claims rather than the description of the above embodiments, and is intended to include all modifications within the meaning and the scope equivalent to the scope of claims.

What is claimed is:

1. A data management system, comprising:
an external device including a first processor configured to execute a simulation using a simulation model,
both generation of data and generation of a first hash value that is a hash value of the data, as consecutive processes, wherein the data includes (i) data body indicating a result of executing the simulation and (ii) meta data of the data body, and
transmit the data and the first hash value; and
a data management device configured to manage the data using distributed ledger technology, wherein:
the data management device includes
a memory storing a distributed ledger, and
a second processor configured to
communicate with the external device,
receive the data and the first hash value from the external device,
generate a second hash value by hashing the received data based on a hash algorithm same as that used to generate the first hash value, and
in response to the first hash value and the second hash value matching each other, register transaction data including the data in a distributed ledger.

2. The data management system according to claim 1, wherein
the second processor is configured to, in response to the first hash value and the second hash value not matching each other, not register the transaction data including the data in the distributed ledger.

3. The data management system according to claim 2, wherein
the metadata includes a model identification information of the executed simulation model, a parameter in the simulation model, or setting information of the simulation.

4. The data management system according to claim 3, wherein the simulation model includes a simulation model regarding a fuel consumption of a vehicle, a power transmission in charging an in-vehicle battery, or an engine output.

* * * * *